United States Patent [19]

Shade

[11] Patent Number: 4,825,897
[45] Date of Patent: May 2, 1989

[54] FLOW CONTROL VALVE

[76] Inventor: Stephen A. Shade, 2222 S. Noche De Paz, Mesa, Ariz. 85202

[21] Appl. No.: 195,805

[22] Filed: May 19, 1988

[51] Int. Cl.[4] ............................................. F16K 17/24
[52] U.S. Cl. ................................ 137/271; 137/516.25; 137/519.5; 239/571
[58] Field of Search ................... 137/460, 498, 516.25, 137/519.5, 271; 239/571

[56] References Cited

U.S. PATENT DOCUMENTS

| | | | |
|---|---|---|---|
| 988,575 | 4/1911 | Joyce . | |
| 1,611,331 | 12/1926 | Braai . | |
| 3,011,517 | 12/1961 | Sanford | 137/516.25 X |
| 3,055,391 | 9/1962 | Shuk | 137/519.5 X |
| 3,367,362 | 2/1968 | Hoffman | 137/517 |
| 3,450,206 | 6/1969 | Watkins | 137/519.5 |
| 3,474,861 | 10/1969 | Watkins | 166/224 |
| 3,787,149 | 1/1974 | Dane | 137/533.11 X |
| 4,171,775 | 10/1979 | Unruh | 239/206 |

Primary Examiner—Robert G. Nilson
Attorney, Agent, or Firm—Warren F. B. Lindsley

[57] ABSTRACT

A fluid flow control device comprising a cylindrical housing adapted to be sealably positioned in a fluid flow system and having a passageway therethrough for the flow of fluid under pressure. The housing defines fluid entrance and exit ports with each port defining a spherical valve seat in the housing. A weighted spherical ball is positioned in the housing to float in the housing during normal fluid flow therethrough but seats in said spherical seats during adnominal fluid conditions in the housing.

1 Claim, 1 Drawing Sheet

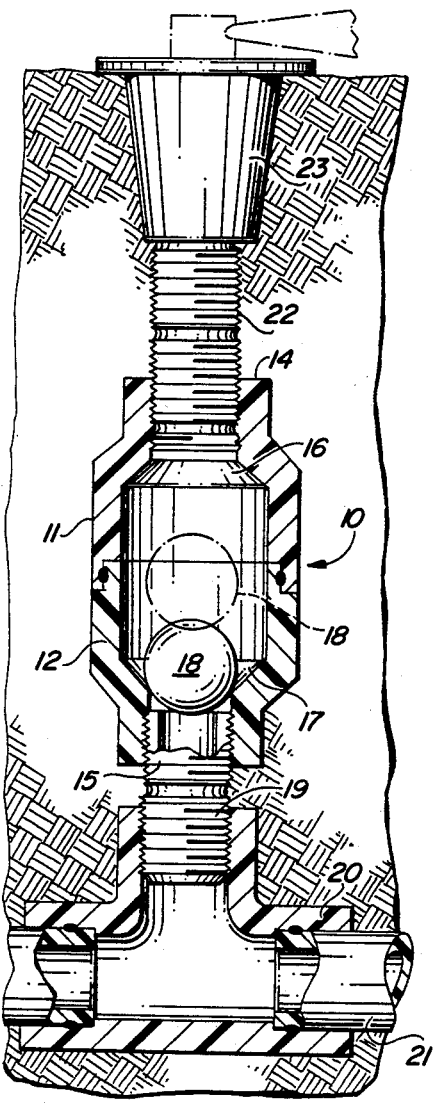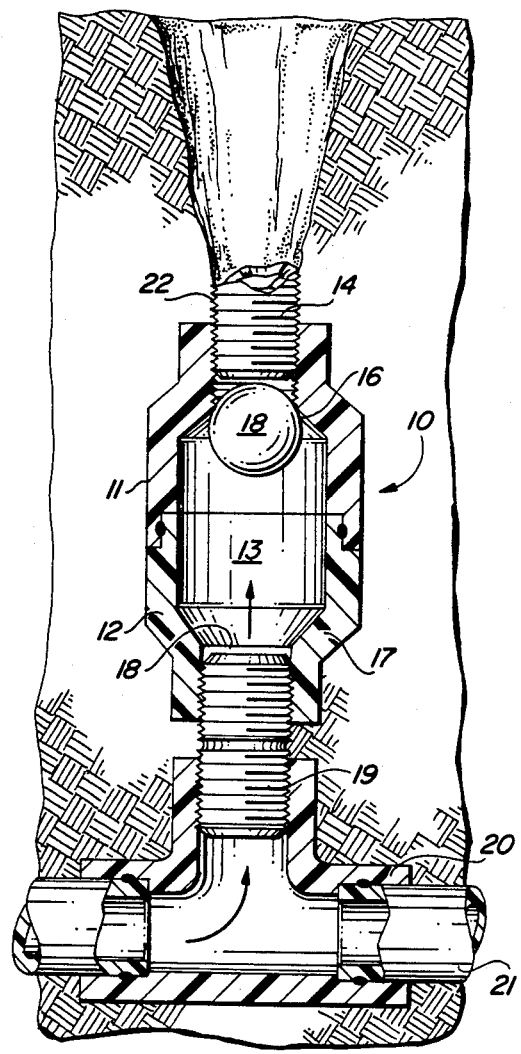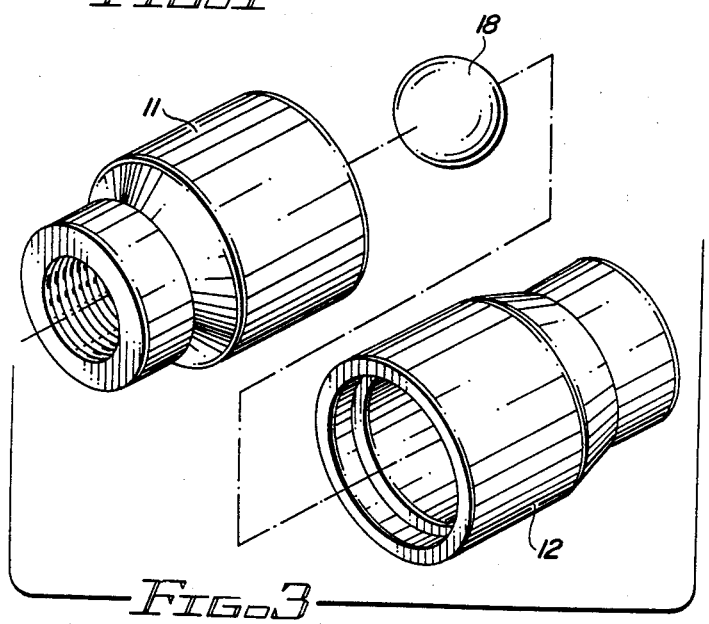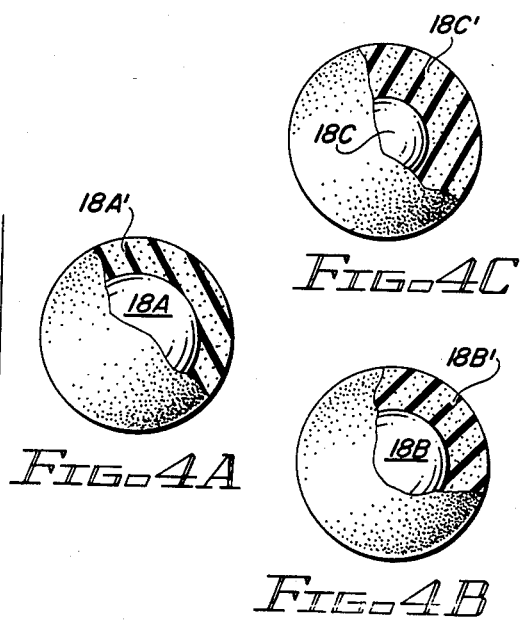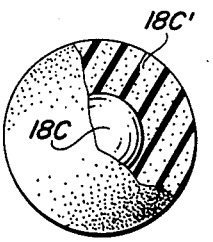

FLOW CONTROL VALVE

BACKGROUND OF THE INVENTION

This invention is related to a fluid flow control device or valve which employs a weighted ball of a conical shape cooperating with one or more seats of a spherical configuration in a flow channel under predetermined conditions. More particularly, the flow control valve disclosed automatically stops the flow of water in an underground sprinkling system when an associated sprinkler head is damaged or removed and additionally seals the system against ground water when the water pressure on the line is substantially reduced.

DESCRIPTION OF THE PRIOR ART

U.S. Pat. No. 988,575 disclosed faucet or valve which is provided with an automatic cut-off which under fluid pressure will close the passage through the valve seat when the valve proper is removed from the case for inspection, adjustment or repair. A spherical ball under force of water pressure closes a central orifice of the faucet.

U.S. Pat. No. 1,611,331 discloses a faucet valve with a stem, which item extends downwardly into a pipe and forms means for maintaining a ball valve unseated during ordinary movement of the faucet valve. The ball valve seats when the valve is removed allowing repair of the faucet valve.

U.S. Pat. No. 3,367,362 discloses a fluid flow control device in the form of a resilient ball which cooperates with a spherical shaped seat. The pressure of the moving fluid compresses or deforms the ball while it engages the seat of spherical configuration. The flow control device may include additional means of spherical configuration caging the ball which may be arranged to exercise a flow controlling function in one direction and a check valve function in the opposite direction.

U.S. Pat. No. 3,474,861 discloses a flow control valve limiting the flow of fluid in a production string in a petroleum well having a jet seat positioned in a flow passageway. A float is positioned in the passageway below the valve seat such that when the float rate of fluid through the passageway reaches a desired maximum, the fluid flow will raise the float onto the seat and close the passageway.

U.S. Pat. No. 4,171,775 discloses a retracting agricultural irrigation sprinkler employing an upright buried cylinder having a riser which is thrust upwardly to a raised position where the top is above ground. A motor in the top of the riser carries and rotates a sprinkler nozzle. A ball valve is positioned in the interior of the cylinder and cooperates with a valve seat which inhibits downward flow of fluid through the riser but permits upward flow therethrough.

None of these valves disclose a ball which floats in the center of a flow passageway between the two valve seats during flow conditions of the valve structure.

SUMMARY OF THE INVENTION

In accordance with the invention claimed, a new and improved flow control valve is disclosed for water irrigation systems employing a ball which will seat in one of two different conical seats when associated pipe is broken or a sprinkler head is damaged downstream of the ball or will seat upstream of the ball when the water pressure is removed from the line but will float in a position intermediate of the two seats when the water pressure is normal in the line.

It is, therefore, one object of this invention to provide a new and improved flow control valve.

Another object of this invention is to provide an improved fluid flow control valve employing a ball that will seat in one of two seats upstream and downstream of the ball in the valve housing under predetermined conditions, but will float intermediate the valve seats during normal fluid flow conditions through the valve.

Another object of this invention is to provide a simple, practicable and efficient flow control valve which can be manufactured at little more than the cost of manufacturing the ordinary faucet or valve.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWING

The present invention may be more readily described by reference to the accompanying drawing, in which:

FIG. 1 is across-sectional view of a flow control valve in a sprinkler system and embodying the invention with a ball valve in a seated position with the fluid pressure low or off and in a dash line position during normal fluid line pressure;

FIG. 2 is a view similar to FIG. 1 with the sprinkler head and part of a riser removed and the ball in a seated position blocking the fluid flow through the valve;

FIG. 3 is an exploded perspective view of the ball and valve housing; and

FIGS. 4A–4C are an assembly of three different weighted balls partially broken away to show their interior structure.

DESCRIPTION OF THE PREFERRED EMBODIMENT

Referring more particularly to the drawing by characters of reference, FIG. 1 discloses a flow control valve 10 comprising two telescopically interconnected cylindrical parts 11 and 12 which when assembled as shown in FIGS. 1 and 2 provide a hollow chamber 13 internally thereof. Each of parts 11 and 12 provide internally threaded openings or ports 14 and 15, respectively, which form internal conical valve seats 16 and 17 axially of the longitudinal axis of the valve. A spherical ball 18 is positioned within the housing formed by parts 11 and 12, which ball is adapted to float within chamber 13, as shown in dash lines in FIG. 1, when the water pressure is normal through the valve and to seat in one or the other of seats 16 and 17 under other predetermined conditions of an associated sprinkler system as hereinafter described.

As shown in FIG. 1, port 15 of part 12 of valve 10 is threadedly connected through a tubular threaded riser 19 to a Tee connector 20 of an underground watering system 21. Part 11 of valve 10 is connected through a threaded riser 22 to a pop-up ground level sprinkler head 23.

FIG. 2 illustrates the assembly of parts shown in FIG. 1 minus a part of riser 22 and the sprinkler head 23. This view is intended to illustrate valve 10 with ball 18 seated in valve seat 16 when the riser pipe has been broken off and a part of it and the sprinkler head removed. Note that under this condition ball 18 is seated in valve seat 16, thereby blocking water from the irrigating system 21 from escaping through this broken connection.

When valve 10 is assembled, as shown in FIG. 1, in association with a pop-up sprinkler head, for example, ball 18 will remain seated in valve seat 17 with little or no water pressure in system 21. During this condition, ball 18 blocks any ground water from entering the system through valve 10. When a line rupture condition exists in the system downstream of valve 10 such as a broken riser 22, as shown in FIG. 2, ball 18 will seat in valve seat 16.

Upon the normal application of water pressure to system 21, ball 18 will be unseated from valve seat 17 and will float in chamber 13, as shown by the dash line configuration of ball 18.

This floating position of ball 18 is accomplished by properly weighting ball 18 in a predetermined relationship to water pressure in system 21.

FIGS. 4A-4C illustrate that the spherical centers 18A, 18B and 18C of ball 18 which may be formed of copper, steel or iron material may be of varied diameter and thickness of plastic coatings 18A', 18B' and 18C' to compensate for various water pressures in system 21. For example, the ball structure shown in FIG. 4A may be used with 40-50 pounds per square inch (PSI) water pressure, FIG. 4B with 30-40 PSI water pressure and FIG. 4C with 20-30 PSI water pressure in system 21.

Balls 18 all maintain the same outside diameter, even though they may be weighted differently.

Under normal pressure conditions, water pressure in system 21 will maintain ball 18 floating in chamber 13, as shown in dash lines in FIG. 1, with normal flow of water around the floating ball and out of the sprinkler head.

When the sprinkler head is removed and/or the riser 14 supporting it is broken, as shown in FIG. 2, the thrust of the water through the broken riser due to the drop in resistance to water flow through valve 10 will force ball 18 into seated arrangement with its valve seat 16, as shown. This function stops the flow of water through the valve until it is repaired.

In accordance with the invention claimed, a new and improved flow control valve is disclosed and claimed which not only maintains a sprinkler or irrigation system in operation even though a part of it is broken or removed, but it more importantly saves the water from being wasted. Further, by maintaining ball 18 in a floating condition during normal use, it avoids the possibility of the ball being frozen in a stationary position during normal use as found in the prior art.

Although but a few embodiments of this invention have been illustrated and described, it will be apparent to those skilled in the art that various changes and modifications may be made therein without departing from the spirit of the invention or from the scope of the appended claims.

What is claimed is:

1. A fluid flow control device comprising:
   a cylindrical housing comprising two telescopically interconnecting parts adapted to be sealably positioned in a fluid flow system and having a passageway therethrough for the flow of fluid under pressure,
   said housing defining a fluid entrance port and a fluid exit port, one at each end thereof,
   each of said ports defining a conical valve seat in said housing,
   a weighted spherical ball positioned in the passageway in said housing, the diameter of said ball being substantially less than the diameter of said passageway.
   said ball comprising a solid metallic spherical core having a plastic coating of a predetermined thickness surrounding it,
   the size and weight of said ball determining the thickness of the plastic surrounding it for selective use in fluid flow systems of different pressures,
   said ball floating in said passageway between said conical seats when normal pressure exists in said housing during fluid flow therethrough and seats in one of said conical seats during predetermined adnormal fluid conditions in said housing.

* * * * *